United States Patent Office 2,726,264
Patented Dec. 6, 1955

2,726,264
ALPHA-HALOGENOSULFAMYLACETOPHENONES

Walter A. Gregory, Wilmington, Del., assignor to E. I. du Pont de Nemours and Company, Wilmington, Del., a corporation of Delaware No Drawing. Application May 27, 1954,
Serial No. 432,889

12 Claims. (Cl. 260—556)

This invention to alpha-halogenosulfamylacetophenones of the kind more particularly described below and to their preparation.

The alpha-halogenosulfamylacetophenones of the invention are represented by the formula (1)

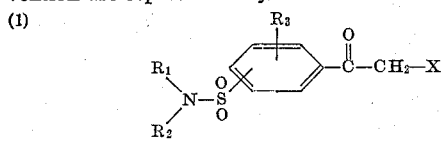

where $R_1$ and $R_2$ are the same or different and represent hydrogen, lower alkyl or hydroxyethyl radicals, $R_3$ is hydrogen, halogen, lower alkyl or lower alkoxyl radicals, and X is a halogen of the class consisting of chlorine, bromine and iodine.

By the terms "lower alkyl" and "lower alkoxy," I mean to include all alkyl and alkoxy radicals containing up to but not exceeding 6 carbon atoms.

Illustrative of the compounds of the present invention there can be named the following:

Alpha-chloro-p-sulfamylacetophenone
Alpha-iodo-p-sulfamylacetophenone
Alpha-bromo-p-sulfamylacetophenone
Alpha-iodo-p-(dimethylsulfamyl)acetophenone
Alpha-chloro-p-(dimethylsulfamyl)acetophenone
Alpha-chloro-m-sulfamylacetophenone
Alpha-bromo-o-(methylsulfamyl)acetophenone
Alpha,2-dichloro-4-sulfamylacetophenone
Alpha-bromo-4-chloro-3-(diethylsulfamyl)acetophenone
Alpha-chloro-2-(dimethylsulfamyl)-4-fluoroacetophenone
Alpha-iodo-3-bromo-4-(ethylsulfamyl)acetophenone
Alpha-chloro-3-(hexylsulfamyl)-4-methylacetophenone
Alpha-bromo - 4-ethyl - 3 - (2-hydroxyethylsulfamyl)-acetophenone
Alpha-bromo-2-methyl-4-sulfamylacetophenone
Alpha - chloro - 4 - butyl - 3 -(dibutylsulfamyl)acetophenone
Alpha-chloro-4-hexyl-3-sulfamylacetophenone
Alpha-chloro-4-ter-butyl-3-(ethylsulfamyl)acetophenone
Alpha - bromo - 4 - methoxy - 3 - (propylsulfamyl)acetophenone
Alpha-chloro-2-ethoxy-5-(methylsulfamyl)acetophenone
Alpha-bromo-4-butoxy-3-sulfamylacetophenone
Alpha-chloro-4-hexyloxy-3-[N,N - bis(2-hydroxyethyl)-sulfamyl]acetophenone The compounds of the present invention can be prepared by reacting a nitrogen containing compound of the formula

2)

where $R_1$ and $R_2$ have the same significance as in formula 1 with an ethylbenzenesulfonyl halide of the formula (3)

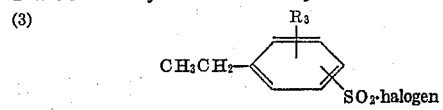

where $R_3$ has the same significance as in formula 1 to give a sulfamylethylbenzene of the formula (4)

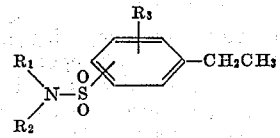

which in turn is oxidized to give a sulfamylacetophenone of the formula (5)

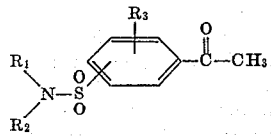

The compound of Formula 5 is then halogenated, in a solvent such as chloroform, methylene chloride, ethylene chloride or glacial acetic acid, to give a compound of Formula 1.

This preparative scheme may be represented diagrammatically as follows:

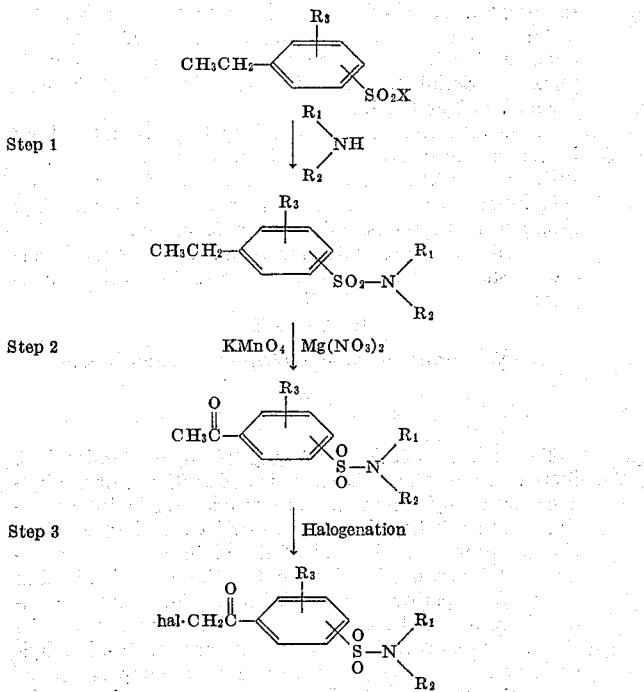

Alternatively, the sulfamylphenacyl halides of my invention can be prepared from a fluorosulfonylacetophenone of the formula (6)

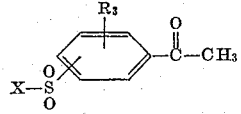

where X is halogen such as chlorine or fluorine, by mixing a compound of Formula 6 with a compound of Formula 2, and halogenating the resulting sulfamylacetophenone.

Compounds represented by Formula 6 are readily available from either of two types of chemical structures, namely, (7)

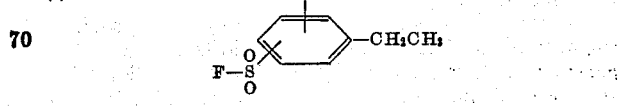

or (8)

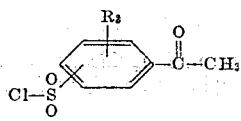

Potassium permanganate and magnesium nitrate hexahydrate may be used to convert a compound of Formula 7 to a compound of Formula 6. It is preferred to add an acetone solution of the fluoride to an aqueous system containing potassium permanganate and magnesium nitrate. Compounds of Formula 8 can be converted to those of Formula 6 by use of potassium fluoride, or potassium bifluoride and water.

The reaction between the nitrogen-containing compound of Formula 2 and the fluorosulfonylacetophenone of Formula 6 is preferably carried out by adding the acetophenone to the nitrogen-containing compound of Formula 2. The reactants are then thoroughly mixed for a period of, say, about 30 minutes, or until solution is completed. The resulting mixture may then be concentrated, or diluted with water, to yield—after the excess base has been neutralized with acid—a compound, which upon halogenation, gives the desired product.

The compounds of the present invention are useful in the preparation of other organic compounds, such as for instance, the substituted and unsubstituted sulfamylphenylamido-1,3-propanediols of my copending parent application, Serial No. 296,959, filed July 2, 1952, now Patent No. 2,680,135.

My novel compounds are antifungal agents and find use in the control of *Alternaria solani*. The meta and ortho sulfamylphenacyl halides of my invention which are unsubstituted on the nitrogen or substituted with one alkyl group form useful polymers in basic media.

In order to more fully understand the invention, reference should be had to the following illustrative examples:

EXAMPLE 1

*Alpha-bromo-p-(dimethylsulfamyl)acetophenone*

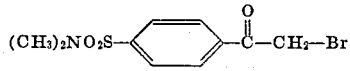

To a stirred solution of 640 g. of dimethylamine in 2 liters of water at 10° C. there is added 990 g. of p-ethylbenzenesulfonyl chloride. The temperature of the reaction mixture is kept between 10–15° C. during the chloride addition. At the end of the addition the temperature of the mixture is raised to 40° C. and maintained at 40° C. for a period of one-half hour. The resulting solution is cooled and then extracted with chloroform. The chloroform extract is distilled. The product, p-dimethylsulfamylethylbenzene, is collected at a temperature of from 178–180° C. at 10 mm. pressure. It is a white crystalline solid melting 49–51° C.

The yield of p-dimethylsulfamylethylbenzene is 864 g. The formula of p-dimethylsulfamylethylbenzene is shown below:

A solution of 800 g. of p-dimethylsulfamylethylbenzene in 9.5 liters of acetone is added to a mixture consisting of 570 g. of potassium permanganate and 1530 g. of magnesium nitrate hexahydrate in 9.5 liters of water warmed to a temperature of 50° C. The reaction mixture is stirred at a temperature of 50° C. for a period of two hours. Then an additional 220 g. of potassium permanganate is added. The reaction is allowed to continue for three hours.

The excess permanganate is reduced by adding sodium sulfite until the filtered solution is colorless. The manganese dioxide is removed by filtering the solution with the use of Celite Filter Aid. The filtrate, which is separated as a semi-crystalline mass, amounts to 794 g. The product can be purified by successive crystallizations from carbon tetrachloride or benzene, or it may be distilled under reduced pressure. A substantial quantity of unoxidized starting material is recovered. The product, p-dimethylsulfamylacetophenone, is a white crystalline solid melting 102–103° C., and has the following structural formula:

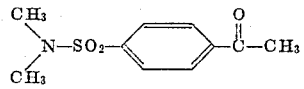

*Analysis.*—Calcd. for $C_{10}H_{13}NO_3S$: C, 52.84; H, 5.76; N, 6.16. Found: C, 52.79; H, 5.88; N, 6.07.

A solution of 261 g. of p-dimethylsulfamylacetophenone in 1.5 liters of glacial acetic acid is stirred at a temperature of 17–20° C. as 183.8 g. of bromine is added. An initial induction period is required for the bromination to start. This varies from 15 minutes to several hours. After the solution decolorizes, the bromine is added dropwise over a period of two hours. The resulting mixture is then poured into 5 liters of ice and water. The product separates as an oil, which soon crystallizes. The product amounts to 349 g. and has a melting range of 75–80° C. After the crude product is recrystallized twice from benzene, 244 g. of white crystalline material is obtained. M. P. 90–92° C. Additional product is recoverable from the filtrate.

The product, alpha-bromo-p-(dimethylsulfamyl)-acetophenone, has the following structural formula:

*Analysis.*—Calcd. for $C_{10}H_{12}BrNO_3S$: Br, 26.01. Found: Br, 25.91.

EXAMPLE 2

*Alpha-chloro-m-sulfamylacetophenone*

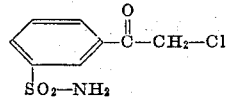

A 50 g. portion of m-chlorosulfonylacetophenone prepared from acetophenone o- and m-sulfonic acid sodium salts by the method which is described in Example 2 of my copending United States application, Serial No. 431,291, filed May 20, 1954, is added with stirring to 100 cc. of concentrated aqueous ammonia. The temperature of the reaction mixture is kept below 30° C. and stirring of the mixture is continued for a period of 24 hours. The solution is concentrated under reduced pressure, and the residue is taken up in water and the solution adjusted to pH 4. The product crystallizes from the water, and may be purified by recrystallization from water. This product is m-sulfamylacetophenone, and has the formula

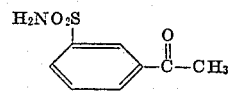

A mixture of 40 g. of m-sulfamylacetophenone with 200 cc. of glacial acetic acid is stirred at 25° C. as 14 g. of chlorine is boiled into the mixture during a two hour period. The reaction is continued for one hour, and the mixture is then poured upon ice and water. The product separates as white crystals and may be purified by recrystallizing from nitromethane.

EXAMPLE 3

*Alpha-bromo-o-(methylsulfamyl)acetophenone*

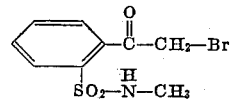

A 200 cc. portion of 25% aqueous methyl amine is stirred and kept between 15–30° C. as 70 g. of o-fluorosulfonylacetophenone is added. Stirring is continued 30 minutes at the end of the addition, and the excess methyl amine is removed by concentrating the solution under reduced pressure. The residue is diluted with water, and the solution made acid with dilute hydrochloric acid. The product, o-(methylsulfamyl)acetophenone, may be purified by distillation under reduced pressure. The structure of the product is

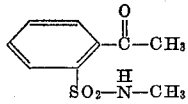

A solution of 64 g. of o-(methylsulfamyl)acetophenone in 200 cc. of methylene chloride is stirred at 20° C. as 48 g. of bromine is added slowly thereto. After an initial induction period, the bromine is decolorized rapidly, and the addition is then made over a two-hour period. One-half hour after the addition is complete, the product may be isolated by distilling the methylene chloride off under reduced pressure.

EXAMPLE 4

*Alpha-bromo-p-(2-hydroxyethylsulfamyl)acetophenone*

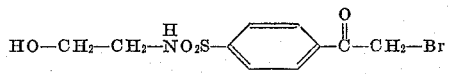

A solution of 300 g. of ethanolamine in 500 cc. of water is stirred as 200 g. of p-chlorosulfonylacetophenone is added slowly. The temperature of the reaction mixture is kept below 25° C. After the addition is complete, the mixture is stirred 30 minutes. The solution is made acid with hydrochloric acid, and the product separates as a crystalline solid. It may be purified by recrystallizing it from water. The product is p-(2-hydroxyethylsulfamyl)acetophenone and has the structure

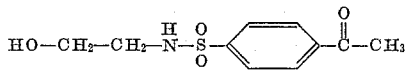

A mixture of 73 g. of p-(2-hydroxyethylsulfonyl)-acetophenone and 300 cc. of glacial acetic acid is stirred at 20° C. as 48 g. of bromine is slowly added. At first the bromine is not decolorized due to an induction period. After the bromination is started, the addition is made over two hours. At the end of the bromination, the mixture is poured into ice and water, and the product separates as a crystalline solid. It may be purified by crystallization from ethanol.

I claim:
1. A compound of the formula

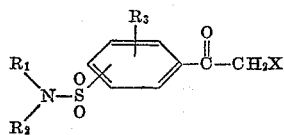

where $R_1$ and $R_2$ are members of the class consisting of hydrogen, lower alkyl and hydroxyethyl radicals, $R_3$ is a member of the class consisting of hydrogen, halogen, lower alkyl and lower alkoxy radicals, and X is a halogen of the group consisting of chlorine, bromine and iodine.
2. Alpha-bromo-p-(dimethylsulfamyl)acetophenone.
3. Alpha-bromo-p-(methylsulfamyl)acetophenone.
4. Alpha-bromo-p-sulfamylacetophenone.
5. Alpha-chloro-p-sulfamylacetophenone.
6. Alpha-chloro-p-(methylsulfamyl)acetophenone.
7. A process which comprises the steps of mixing a compound of the formula

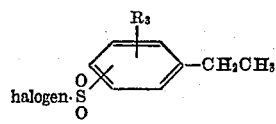

where $R_3$ is a member of the class consisting of hydrogen, halogen, lower alkyl and lower alkoxy radicals, with a compound of the formula

where $R_1$ and $R_2$ are members of the class consisting of hydrogen, lower alkyl and hydroxyethyl radicals, to yield a compound of the formula

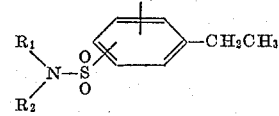

oxidizing the latter compound with potassium permanganate and magnesium nitrate to obtain a compound of the formula

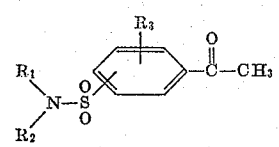

halogenating the latter compound, and recovering a compound of the formula

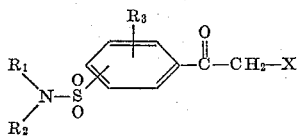

where X is a member of the class consisting of chloro, bromo and iodo radicals.
8. A process comprising the steps of reacting dimethylamine and ethylbenzenesulfonyl chloride to obtain p-dimethylsulfamylethylbenzene, oxidizing the latter compound with magnesium nitrate hexahydrate and potassium permanganate, and brominating the resulting p-dimethylsulfamylacetophenone thus formed in the presence of glacial acetic acid to obtain alpha-bromo-p-(dimethylsulfamyl)acetophenone.
9. A process which comprises the step of mixing a sulfamylacetophenone of the formula

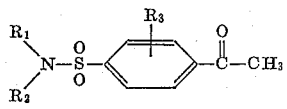

where $R_1$ and $R_2$ are members of the class consisting of hydrogen, lower alkyl and hydroxyethyl radicals and $R_3$ is a member of the class consisting of hydrogen, halogen, lower alkyl and lower alkoxy radicals with a halogen of the class selected from chlorine, bromine and iodine to obtain a compound of the formula

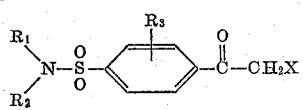

where $R_1$, $R_2$, $R_3$ have the same significance as above and X is a member of the class consisting of chloro, bromo and iodo radicals.
10. A process of claim 9 wherein the halogen and sulfamylacetophenone are brought into contact with each other in the presence of an organic solvent.
11. A process of claim 10 wherein the solvent is glacial acetic acid.
12. A process of claim 11 where the solvent is a lower alkylene chloride.

References Cited in the file of this patent
UNITED STATES PATENTS 2,680,120   Gregory _____ June 1, 1954
2,680,135   Gregory _____ June 1, 1954